United States Patent [19]
Smith

[11] 3,731,898
[45] May 8, 1973

[54] MISSILE SUSPENSION SYSTEM
[75] Inventor: Ira D. Smith, Bedford, Ohio
[73] Assignee: Pneumo Dynamics Corporation, Cleveland, Ohio
[22] Filed: July 27, 1971
[21] Appl. No.: 166,461

[52] U.S. Cl. ............... 248/328, 89/1.8, 248/358 R
[51] Int. Cl. ........................... F16f 7/00, F16f 9/346
[58] Field of Search ............... 248/324, 328, 332, 248/331, 17, 18; 89/1.8, 1.81, 1.817, 1.816; 188/1 B

[56] References Cited

UNITED STATES PATENTS

| | | | |
|---|---|---|---|
| 3,516,628 | 6/1970 | Kendall | 248/324 X |
| 3,421,363 | 1/1969 | Herr | 89/1.8 X |
| 3,368,452 | 2/1968 | Fredrickson et al. | 89/1.816 |
| 3,350,984 | 11/1967 | Neuman et al. | 89/1.8 |
| 3,089,388 | 5/1963 | Webster et al. | 89/1.816 |
| 3,089,389 | 5/1963 | Andrews et al. | 89/1.81 X |
| 3,266,373 | 8/1966 | Brown | 89/1.81 X |
| 3,160,060 | 12/1964 | Zsoka et al. | 89/1.816 |

*Primary Examiner*—J. Franklin Foss
*Attorney*—Stephen M. Mihaly

[57] ABSTRACT

A suspension system for precisely positioning missiles and other structures below ground level comprising a support stand including a pair of telescoping members having a liquid spring therebetween for maintaining the members in resiliently spaced-apart relation. The members are suspended from above by a plurality of cables connected to the lower member, and a support ring for the missile or other structure is carried by the upper member. Angular and vertical adjustment of the suspension system may be achieved after installation by raising or lowering one or more of the suspension cables which adjusts the position of the missile or other structure supported thereby.

6 Claims, 1 Drawing Figure

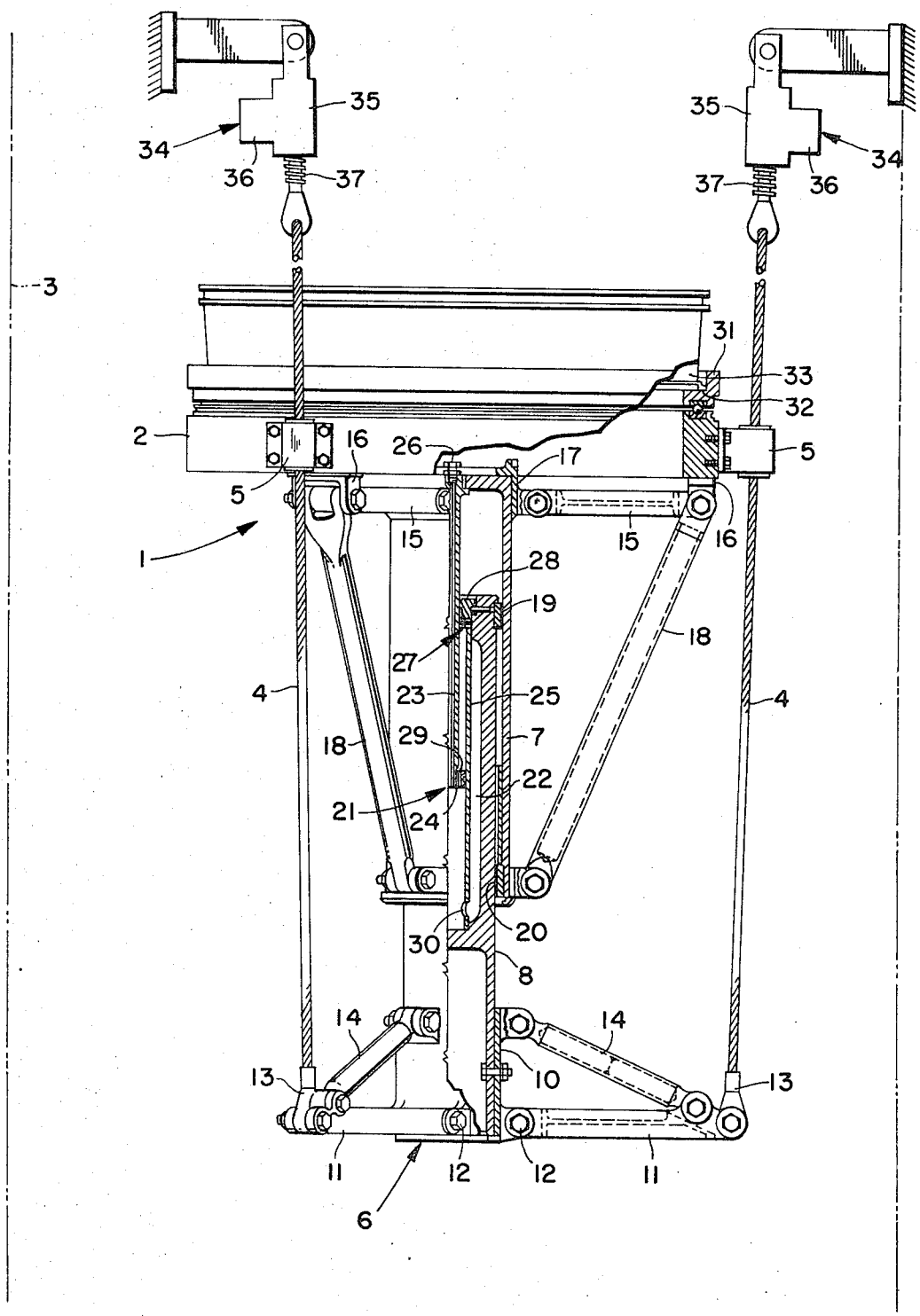

MISSILE SUSPENSION SYSTEM

The present invention relates generally as indicated to a suspension system for supporting missiles or other structures below ground level in such a manner so as not to be adversely affected by ground shocks and the like.

The storing of missiles and other structures in underground silos will protect them against damage from blasts and flying objects above ground level, but to maintain them in a constant state of readiness also requires protection against ground shocks which might otherwise cause the missiles to tip or fall against the sides of the silos or at least cause them to change their precise position within the silos, making them unsuitable for use. Various types of suspension systems have been devised which will adequately support missiles in silos and also protect them against shock, but they are generally quite complicated, making them more expensive to manufacture and less reliable than need be.

It is accordingly a principal object of this invention to provide a suspension system of a more simplified design which affords the missile the necessary support and protection against ground shocks.

Another object of this invention is to provide such a suspension system which maintains the missile in a precise location within the silo and permits precise adjustment of the position of the missile after installation as may be desired.

Another object is to provide such a suspension system which readily accommodates missiles of various sizes and weights.

These and other objects of the present invention may be achieved by providing a suspension system including a support stand having upper and lower telescoping members which are maintained in resiliently spaced-apart relation by a spring interposed therebetween. The upper member has affixed thereto a support ring for the missile or other structure, and the lower member has a plurality of suspension cables connected thereto for supporting the suspension system from above. The spring absorbs any downward forces acting on the suspension system caused by ground shocks and the like, and the suspension cables, because of their length, permit sideward movement of the suspension system when acted on by horizontal forces while maintaining the missile substantially vertical. Angular and vertical adjustment of the suspension system may also be achieved after installation by raising and lowering one or more of suspension cables to obtain precise adjustment of the position of the missile supported thereby as desired.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In the annexed drawing:

The sole FIGURE is a schematic side elevation view of a preferred form of suspension system constructed in accordance with this invention having portions broken away to show the internal construction of the upper and lower telescoping members and support member carried thereby.

DESCRIPTION OF THE PREFERRED EMBODIMENT

In the drawing, there is schematically shown a preferred form of suspension system 1 in accordance with this invention including a support platform 2 desirably in the shape of a ring adapted to be suspended within a silo 3 or other opening below ground level as by means of a plurality of suspension rods or cables 4. Three such suspension cables 4 are desirably provided, uniformly spaced around the outer periphery of the support ring 2. The cables 4 preferably extend below the support ring 2 through cable guides 5 suitably fastened to the outer periphery of the support ring for connection at their lower ends to a tripod support 6 attached to the lower member 8 of a support stand including a pair of upper and lower telescoping members 7 and 8.

The tripod support 6 illustrated consists of a sleeve 10 secured to the lower end of the lower member 8 and having at least three support arms 11 extending radially outwardly therefrom in circumferentially uniformly spaced relation. The inner ends of the support arms 11 are pivotally connected to the sleeve 10 by pins 12, and cable connectors 13 on the lower ends of the suspension cables 4 are pin connected to the outer ends of the support arms. The support arms 11 are maintained substantially rigid and in a generally radial plane by a corresponding number of braces 14 extending at an angle from the upper end of the sleeve 10 to the outer end of the support arms with opposite ends of the braces 14 being pivotally connected to the sleeve 10 and support arms 14, respectively.

The support ring 2 is connected to the upper member or cylinder 7 substantially centrally of the support ring by at least three circumferentially uniformly spaced mounting arms 15 having their outer ends pin connected to mounting brackets 16 on the support ring 2 and their inner ends pin connected to a sleeve 17 attached to the uppermost end of the upper member 7. Extending from the outer ends of the mounting arms 15 to the lower end of the upper member 7 and pivotally connected thereto are a corresponding number of cylinder braces 18 which cooperate with the mounting arms and upper member to provide a rigid but open support for the support ring.

The upper and lower members 7 and 8 are maintained in close sliding relation with each other by spaced apart bearings 19 and 20 on the upper end of the lower member 8 and lower end of the upper member 7, respectively, which provide a close sliding fit between the two members. Normally, the upper and lower members 7 and 8 are resiliently urged apart by a spring assembly 21 interposed therebetween. Preferably, the spring assembly 21 consists of a chamber 22 in the lower member 8 which receives a rod 23 extending downwardly from the upper end of the upper member 7. Attached to the lower end of the rod 23 is a piston 24 which may be in sliding contact with a stationary axially extending sleeve 25 within the chamber 22. The chamber 22 is desirably filled with a compressible fluid through a charging valve 26 in the upper end of the rod 23, which fluid is prevented from leaking from the chamber 22 by a high pressure seal 27 disposed between the rod 23 and upper end of the lower member 8. A closure member 28 threadedly received in the upper end of the lower member 8 retains the seal 27 in place.

When the load of a missile or other structure is applied to the support ring 2, the liquid in the chamber 22 is compressed by downward movement of the piston 24 on the lower end of the rod 23 until the force of the fluid acting on the larger diameter bottom face of the piston 24 is sufficient to support the weight of the load. During movement of the piston 24 and rod 23 in either direction within the chamber 22, the fluid is forced through bleed holes 29 which may be provided either in the stationary sleeve 25 or in the piston 24 as shown to exert a damping action on the movement of the support ring 2 in either direction thereby reducing oscillations. One or more openings 30 may also be provided in the stationary sleeve 25 for filling of the entire chamber 22 with compressible fluid.

To assist in mounting of a missile or other structure on the support ring 2, a receiver ring 31 may be bearing mounted on the upper end of the support ring. The receiver ring 31 has an internal step or shoulder 32 as shown for engagement by a missile adaptor ring 33 to accommodate missiles or other structures of different diameters.

The upper end of each suspension cable 4 is desirably connected to a suitable drive mechanism 34 which permits raising or lowering of one or more of the cables to adjust the position of the entire suspension system 1 within the silo opening. Each such drive mechanism 34 may, for example, comprise a housing 35 attached to the wall of the silo and containing a motor driven worm 36 for raising and lowering a screw shaft 37 to which the upper end of a cable is connected. Accordingly, should it become desirable or necessary to change the position of the suspension system 1 within the silo because of a failure of the spring assembly 21 or an applied load which disturbed such position, it is a simple matter to do so merely by raising or lowering one or more of the suspension cables to vary the angular and/or vertical position of the suspension system.

From the foregoing, it will now be seen that the suspension system of the present invention is of a relatively simple and highly reliable design which permits precise adjustment of the position of the suspension system after installation in the event of failure of any part or disturbance due to shock loads, and also readily accommodates different size structures.

The embodiments of the invention in which an exclusive property or privilege is claimed are defined as follows:

1. A suspension system comprising a support member, a support stand for said support member, a plurality of vertically disposed cable-like suspension elements having their lower ends connected to said support stand for supporting said support stand, and drive means connected to the upper ends of said suspension elements for raising and lowering said suspension elements to adjust the position of said support stand wherein said support stand comprises a pair of telescoping upper and lower members, said support member being connected to said upper member, said suspension elements being connected to said lower member, and spring means interposed between said upper and lower members for resiliently urging said upper and lower members apart.

2. The suspension system of claim 1 wherein said drive means comprises a screw shaft on the upper end of each of said suspension elements and a motor driven screw engaging each screw shaft.

3. The suspension system of claim 1 further comprising at least three uniformly circumferentially spaced support arms extending radially outwardly from the lower end of said lower member, and a corresponding number of braces extending at an angle from the outer ends of said support arms to said lower member to provide a substantially rigid structure, said suspension elements being connected to the outer ends of said support arms.

4. The suspension system of claim 3 wherein said support stand has a plurality of uniformly circumferentially spaced cable guides secured to the outer periphery thereof through which said cable-like suspension elements extend for connection to said support arms.

5. The suspension system of claim 3 wherein said support member is in the shape of a ring and there are at least three uniformly circumferentially spaced mounting arms connecting said ring to said upper member substantially centrally thereof, and a corresponding number of braces extending at an angle from the outer ends of said mounting arms to said upper member to provide a substantially rigid structure.

6. The suspension system of claim 5 further comprising a receiver ring mounted on said support ring, said receiver ring having an internal shoulder for engagement by an adaptor for accommodating different size structures.

* * * * *